Patented Sept. 22, 1942

2,296,696

UNITED STATES PATENT OFFICE 2,296,696

HYDRATION OF OLEFINS

Dale F. Babcock, Wilmington, Del., assignor to E. I. du Pont de Nemours & Company, Wilmington, Del., a corporation of Delaware Application July 22, 1939, Serial No. 285,854

4 Claims. (Cl. 260—641)

This invention relates to an apparatus and process for the hydration of olefins, and more particularly to an apparatus and process for the hydration of ethylene so as to produce ethyl alcohol.

Olefins have been hydrated by contacting same with water in the presence of a hydration catalyst such as sulfuric acid followed by the recovery of the alcohol from the products of reaction. The invention described herein is an improvement in this type of process and by the use of the invention the efficiency of the hydration reaction is markedly increased.

This invention has as its object to provide an improved method and apparatus for the production of hydration products of olefins. Another object is to provide an improved process for the production of hydration products of ethylene. Still another object is to provide an improved apparatus for the hydration of ethylene. Another object is to provide an improved process and apparatus for conducting an exothermic reaction between two reactants, one in the liquid phase and the other in the gas phase. A further object is the production of hydration products of olefins using a minimum of equipment and a low expenditure of power. Other objects will be apparent from a reading of the following description of the invention.

These objects are accomplished by the present invention which comprises the continual absorption under high pressure of an olefin in an aqueous medium containing a hydration catalyst, reducing the pressure on the products of reaction, and distilling the mixture at the reduced pressure so as to recover the products of hydration, followed by recycling the aqueous medium containing the hydration catalyst. The invention also embraces the apparatus and process wherein there is a diminished temperature gradient of the aqueous medium containing the hydration catalyst as it passes through the hydration zone in contact with the olefin. The invention may best be understood by reference to the following detailed description thereof.

Figure 1:
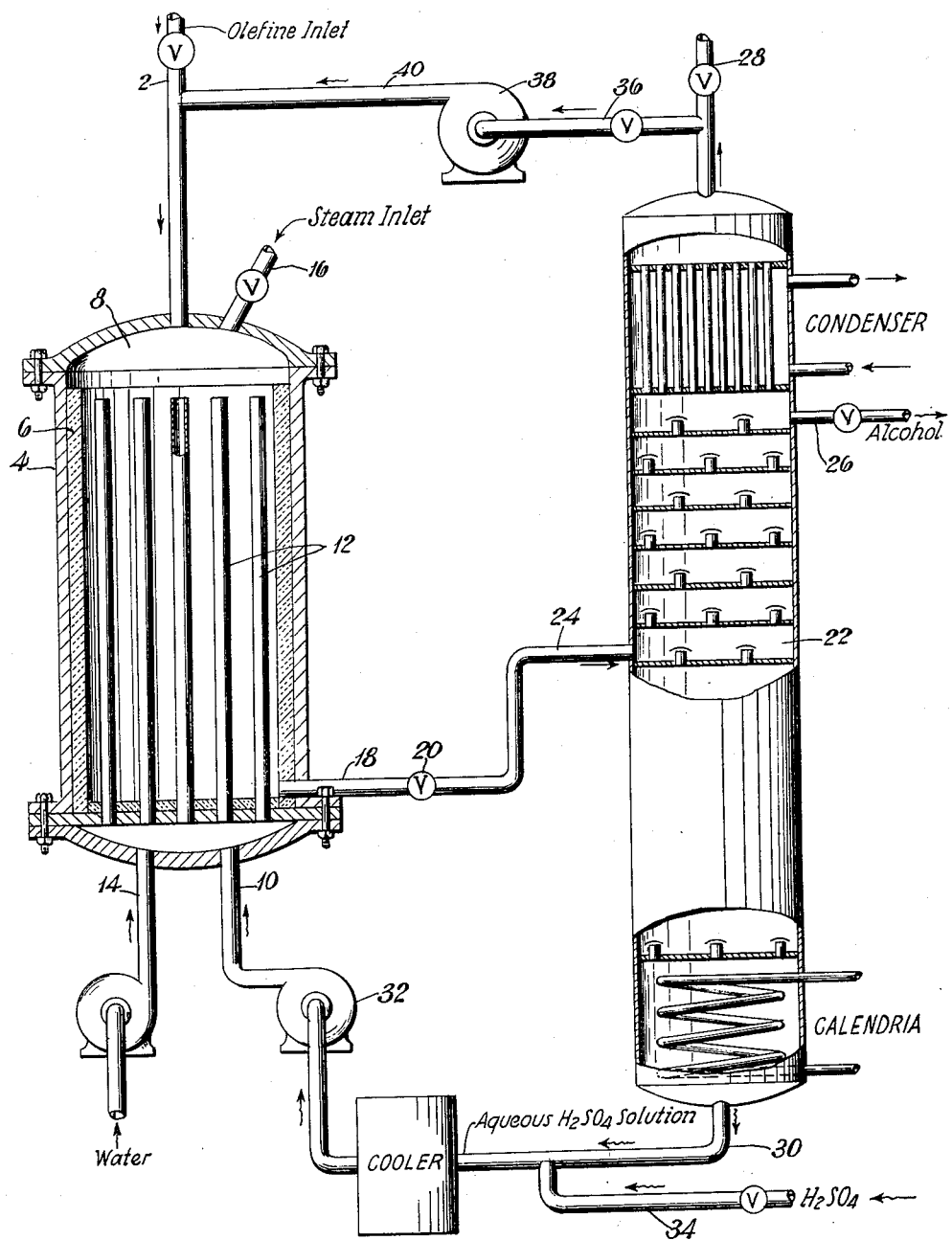
Figure 2:
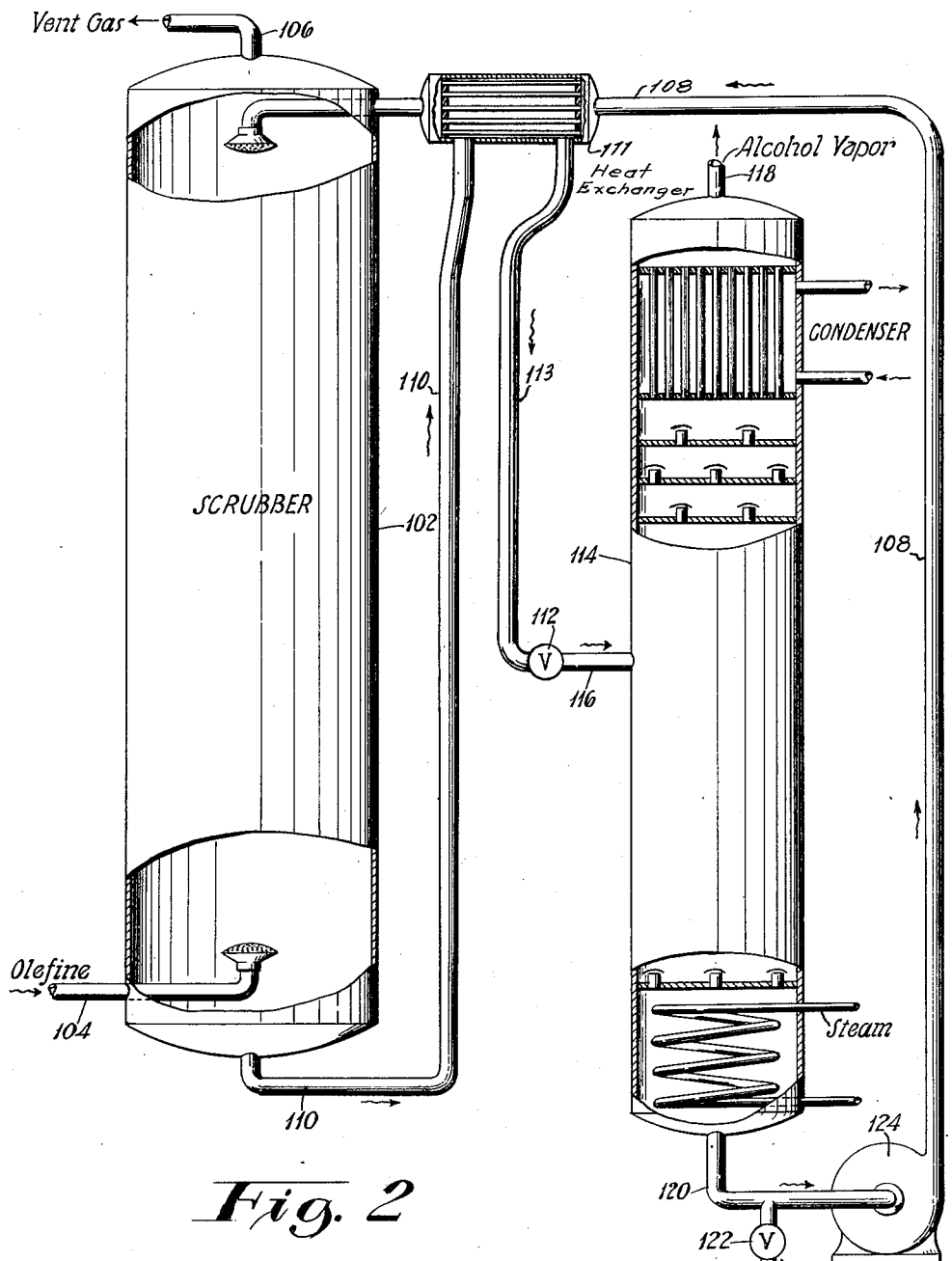

Referring to the drawings, Figure 1 is a diagrammatical flow sheet of a process and apparatus illustrating one embodiment of the invention. Figure 2 is a diagrammatical flow sheet of a process and apparatus illustrating another embodiment of the invention.

Referring to Figure 1, the olefin to be hydrated, such as ethylene, enters the converter 4 through conduit 2 under a pressure in excess of 100 lbs. per sq. in. The converter 4 is lined with an acid-resistant material 6 which encloses the hydration chamber 8. The aqueous medium containing a hydration catalyst, such as a solution of sulfuric acid in water, enters the converter 4 through conduit 10. This solution passes upward through tubes 12 to the top thereof where it flows over the top of the tubes and down the outside in contact with the ethylene vapor. Additional water, as needed, is passed into the converter 4 via conduit 14 and steam, if needed to regulate the temperature within the converter, is introduced through conduit 16. As the hydration reaction is exothermic, heat is generated in the stream of liquid flowing down the outside of tubes 12. This heat is usually sufficient to maintain the reaction; if not, it may be supplemented by steam added at 16. The incoming aqueous sulfuric acid mixtures passing up the tubes 12 serve to cool the fluids flowing down the outside of the tube, thereby producing a diminishing temperature gradient in this liquid as the concentration of ethyl alcohol increases. This diminishing temperature gradient produces a marked improvement in the hydration reaction. The liquid containing the products of reaction collect at the bottom of the reaction chamber 8 and are withdrawn through conduit 18 where the pressure is reduced to approximately one atmosphere by passing through expansion valve 20. The resulting fluid mixture then enters distillation column 22 via conduit 24. This distillation column is so operated that ethyl alcohol is recovered from the uppermost plates via conduit 26. Vent gases, if any, are withdrawn from the top of the column via conduit 28 and sulfuric acid-water mixture is recovered from the bottom of the column where it may be recycled via conduit 30 and pump 32 back to the reaction chamber 8. Aqueous sulfuric acid to start the operation, or as needed, may be introduced at any point in the system. In the diagrammatical drawing this introduction is made via conduit 34. If the vent gases withdrawn from the top of the rectifying column 22 contain an appreciable amount of ethylene, these may, if desired, be recycled by passing same through conduit 36, pump 38, and conduit 40.

The tubes 12 are made of tantalum or other acid-resistant materials. The acid resistant lining 6 consists of brick or lead or a similar material.

The following example is given so as to show a specific instance of the carrying out of the process as described by the above apparatus.

Example I

A 25% aqueous solution of sulfuric acid in water at about 30° C. is pumped into the above described converter. Essentially pure ethylene is compressed into the top of the pressure shell of the converter at such a rate that a pressure of 2000 lbs. per sq. in. absolute is maintained. The acid rising in the tubes is heated to approximately 190° C. by the heat exchange action of the liquid falling in a film down the outside surface of the tubes. The exothermic nature of the reaction of ethylene with the dilute sulfuric acid is ordinarily sufficient to maintain the temperature in the top portion of the converter at approximately 240° C. If at any time the reaction heat is inadequate to maintain the desired temperature, the deficiency is made up by adding high pressure steam directly into the top of the converter. The sensible heat of the dilute acid and dissolved hydration products is removed as the liquid falls down the outside surface of the tubes due to heat exchange with the liquid rising inside the tubes. This dilute acid liquor with dissolved products of hydration, which is continuously expanded from the converter through a connection located just above the tube sheet, has an average temperature of 45° C. and contains approximately 16% by weight of ethyl alcohol. The effluent from the converter is rectified at essentially atmospheric pressure producing a gas which is essentially pure ethylene which is recycled to the converter, a high proof alcohol distillate, and a residual fraction containing essentially all of the sulfuric acid orignally charged into the converter. This residual acid is cooled by heat exchange or otherwise and is then pumped back into the converter together with enough make-up water to maintain the original concentration of the sulfuric acid catalyst. Small quantities of diethyl ether and traces of acetaldehyde and sulfur dioxide were detected in the spirit fractions.

Figure 2 illustrates another embodiment of the applicant's invention. In Figure 2 ethylene-containing gases enter the scrubber 102 via conduit 104 under a pressure of at least 100 lbs. per sq. in. These gases are preferred to be substantially pure ethylene or ethylene containing not more than about 10% inert material, although a somewhat higher proportion of inerts is still operable. The ethylene-containing gases pass upward in scrubber 102, coming in contact with the descending sulfuric acid water mixture which flows over a fluid-distributing medium such as acid-resistant Raschig rings. Vent gases escape from the scrubber via conduit 106. The water-sulfuric acid mixture is sprayed into the top of scrubber 102, entering said scrubber via conduit 108. The products of reaction are withdrawn from the base of scrubber 102 via conduit 110, passing in heat exchange relationship with the fluid in conduit 108 by passing through heat exchanger 111. The products of reaction then pass to expansion valve 112 via conduit 113 where the pressure is reduced to approximately atmospheric, whence they enter distillation column 114 via conduit 116. Distillation column 114 is operated so as to remove alcohol vapor from the top thereof via conduit 118 and an aqueous solution of sulfuric acid from the bottom via conduit 120. Additional water and sulfuric acid may be added to the system when needed via conduit 122. The sulfuric acid-water mixture in conduit 120 is increased in pressure by pump 124 to the pressure of the scrubber and recycled via conduit 108 thereto. The following example illustrates the operation of this process.

Example II

In this experiment a 20% solution of sulfuric acid is preheated to approximately 210° C.; e. g., by heat exchange with the reaction product, and fed into the top of a converter which consists of an acid-resistant pressure shell filled with acid-resistant Raschig rings. Ethylene is compressed into this reaction chamber at such a rate that a pressure of 1100 lbs. per sq. in. is maintained. The liquid produced at the base of the converter is passed through the heat exchanger to preheat the acid feed and is continuously expanded into a rectifying column which operates at essentially atmospheric pressure. As above, this operation produces a vent gas, a part of which is cycled back to the converter, a spirit distillate, and a dilute acid residuum. This residual acid is pumped back to the converter through the heat exchanger together with enough make-up water or steam to maintain the initial concentration and temperature of the acid. The average temperature within the converter is approximately 240° C. and the liquid reaction products contain approximately 7% by weight of alcohol. Small quantities of ether, acetaldehyde and sulfur dioxide are also synthesized. A small quantity of gas is continuously purged from the converter in order to prevent the accumulation of inert gases.

The preferred temperature for this reaction is in the range of 200° to 260° C. However, the reaction will take place within the range of 150° to 300° C. In the first example ethylene is in contact with the catalyst over a temperature range of 50° to 240° C. and reaction takes place over this entire zone although at an extremely low rate at the lower temperature. The optimum pressure for this reaction lies in the zone of 500 lbs. to 3000 lbs.; however, all pressures above 100 lbs. per sq. in. are operative, the upper limit being governed only by the strength of the apparatus in which the reaction is carried out.

In the examples sulfuric acid is given as the catalyst. While this is preferred, other mineral acids, such as phosphoric, may be used. Further, small amounts of metal oxides, such as the oxides of copper and iron, may be added in order to promote the catalytic function of the acid. The concentration of the catalyst varies with the compound used; for example, it is preferable to operate with sulfuric acid of about 20% strength. Because of the diminished catalytic activity as the concentration of the catalyst decreases, it is preferable to use a sulfuric acid concentration of not less than about 5%. Likewise, the practical upper limit of sulfuric acid concentration is approximately 50%. With phosphoric acid, on the other hand, it is preferable to operate with an acid concentration of about 50%, whereas the maximum practical acid concentration with phosphoric acid is of the order of 85%.

In the examples noted above pure ethylene has been used. The process is, however, adaptable with suitable adjustments to the use of a gas relatively dilute in ethylene, especially when carrying out the reaction as shown in Example I.

Besides ethylene, other olefinic compounds may be used, although with less advantage when using olefins of higher molecular weight; for example, isoproyl alcohol may be synthesized from propylene according to the processes as described in the above two examples. The use of ethylene in this process shows outstanding advantages.

One advantage of this invention, as carried out in the particular type of converter disclosed in Figure 1, derives from the provision that the reaction takes place in a zone of initially high but progressively decreasing temperature. The result is a maximum reaction rate at the start and a progressively more favorable equilibrium conversion with decrease of temperature. This may be more completely understood by the following example. I find that at 250° C. the reaction between ethylene and water in the presence of catalyst is relatively rapid. I find also that when operating at this temperature and under a pressure of 1000 lbs. per sq. in. the equilibrium conversion is around 10%. When the temperature has fallen by heat exchange action to 225° C., the equilibrium conversion is approximately 20% but the reaction rate is less than one-half that served at 250° C. In the heat exchange converter described above the initial reaction rate is so high that, when operating at about 250° C., approximate equilibrium conditions are established at that temperature and, as the liquid is cooled, additional reaction takes place but at a much lower rate. However, the final product obtained is more concentrated in alcohol than it is possible to obtain when operating at the high temperature. Also the alcohol concentration is higher than it is practicable to attain when operating at some lower temperature.

It is apparent that many widely different embodiments of this invention may be made without departing from the spirit and scope thereof and therefore it is not intended to be limited except as indicated in the appended claims.

I claim:

1. A process which comprises progressively increasing the temperature of a fluid containing water and a hydration catalyst to a temperature between 150° and 300° C., bringing the heated fluid into contact with an olefin under a pressure of at least 100 lbs. per sq. in., passing the said fluid while in contact with the olefin countercurrently and in heat exchange relationship with, but out of contact with, the incoming fluid and thereby progressively decreasing the temperature of said fluid in contact with the olefin as it passes through the reaction zone.

2. The process in accordance with claim 1 characterized in that the hydration catalyst is a sulfuric acid.

3. The process in accordance with claim 1 characterized in that the olefin is ethylene.

4. A process for the production of ethyl alcohol which comprises progressively increasing the temperature of an aqueous solution of sulfuric acid to a temperature of about 200° C., to about 260° C., bringing the heated solution into contact with ethylene under a pressure of about 500 to about 3000 lbs. per sq. in., passing the said aqueous solution while in contact with ethylene countercurrently and in heat relationship with, but out of contact with, the incoming aqueous solution and thereby progressively decreasing the temperature of the heated aqueous solution, as it passes through the reaction zone.

DALE F. BABCOCK.